US012709156B2

(12) United States Patent
Tsujino et al.

(10) Patent No.: US 12,709,156 B2
(45) Date of Patent: Aug. 18, 2026

(54) VEHICLE DISPLAY CONTROL DEVICE, VEHICLE DISPLAY CONTROL METHOD, AND PROGRAM

(71) Applicant: TOYOTA JIDOSHA KABUSHIKI KAISHA, Toyota (JP)

(72) Inventors: Miki Tsujino, Nagakute (JP); Masashi Hatanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/915,553

(22) Filed: Oct. 15, 2024

(65) Prior Publication Data

US 2025/0121685 A1 Apr. 17, 2025

(30) Foreign Application Priority Data

Oct. 17, 2023 (JP) ................................ 2023-179128

(51) Int. Cl.

| | |
|---|---|
| ***B60K 35/22*** | (2024.01) |
| ***B60K 35/28*** | (2024.01) |
| ***B60W 50/14*** | (2020.01) |

(52) U.S. Cl.

CPC .............. *B60K 35/22* (2024.01); *B60K 35/28* (2024.01); *B60W 50/14* (2013.01); *B60W 2050/146* (2013.01)

(58) Field of Classification Search

CPC .. B60K 35/22; B60K 35/28; B60K 2360/166; B60K 2360/171; B60K 2360/1868; B60K 35/10; B60K 35/23; B60K 35/29; B60K 2360/172; B60K 2360/175; B60K 35/60; B60K 35/81; B60W 50/14; B60W 2050/146

See application file for complete search history.

(56) References Cited

U.S. PATENT DOCUMENTS

| | | | | |
|---|---|---|---|---|
| 9,487,139 | B1 * | 11/2016 | Ishida | B60W 30/08 |
| 2004/0212483 | A1 * | 10/2004 | Braeuchle | B62D 15/029 340/438 |
| 2011/0128139 | A1 * | 6/2011 | Tauchi | B60K 37/00 340/439 |
| 2017/0113686 | A1 | 4/2017 | Horita et al. | |
| 2018/0111628 | A1 * | 4/2018 | Tamagaki | B60W 30/143 |
| 2019/0016345 | A1 * | 1/2019 | Kitagawa | B60W 30/18163 |
| 2020/0262424 | A1 * | 8/2020 | Kong | G05D 1/0212 |
| 2021/0261149 | A1 | 8/2021 | Doi | |

(Continued)

FOREIGN PATENT DOCUMENTS

| | | | | |
|---|---|---|---|---|
| CN | 101900881 A | * 12/2010 | | G02B 1/14 |
| DE | 102013016242 A1 | * 4/2015 | | G08G 1/166 |

(Continued)

*Primary Examiner* — Rufus C Point

(74) *Attorney, Agent, or Firm* — Dinsmore & Shohl LLP

(57) ABSTRACT

A vehicle display control device that displays predetermined information in a display region that is at a periphery of a driver's seat in a case in which at least one travel assist function among acceleration/deceleration or steering operates, the device includes a processor, wherein the processor: displays an image, which expresses a reason why a travel assist function has operated, in the display region; and displays a mark, which corresponds to a type of the travel assist function, in a vicinity of the image.

6 Claims, 14 Drawing Sheets

(56) References Cited

U.S. PATENT DOCUMENTS

2023/0271625 A1 8/2023 Doi
2023/0271626 A1 8/2023 Doi

FOREIGN PATENT DOCUMENTS

JP 2015-199439 A 11/2015
JP 2021-133777 A 9/2021
WO WO-2016039428 A1 * 3/2016 ............ B60K 35/81

* cited by examiner

VEHICLE DISPLAY CONTROL DEVICE, VEHICLE DISPLAY CONTROL METHOD, AND PROGRAM

CROSS-REFERENCE TO RELATED APPLICATION

This application is based on and claims priority under 35 USC 119 from Japanese Patent Application No. 2023-179128 filed on Oct. 17, 2023, the disclosure of which is incorporated by reference herein.

BACKGROUND

Technical Field

The present disclosure relates to a vehicle display control device, a vehicle display control method, and a non-transitory recording medium on which a program is recorded.

Related Art

Japanese Patent Application Laid-Open (JP-A) No. 2021-133777 discloses a display control section that, when a target of a deceleration assisting process is detected, displays an image for providing notice of the detected target of the deceleration assisting process in a deceleration display region of a display within a vehicle cabin.

However, the device disclosed in JP-A No. 2021-133777 merely displays a traffic signal, a vehicle or the like on the display, and therefore, there are cases in which the vehicle occupant cannot understand the reason why the drive assist function has operated merely by glancing at the display.

SUMMARY

An object of the present disclosure is to provide a vehicle display control device, a vehicle display control method, and a non-transitory recording medium on which a program is recorded, that enable a vehicle occupant to intuitively understand the reason why a drive assist function has operated.

A vehicle display control device of a first aspect is a vehicle display control device that displays predetermined information in a display region that is at a periphery of a driver's seat in a case in which at least one travel assist function among acceleration/deceleration or steering operates, the device including: a processor, wherein the processor: displays an image, which expresses a reason why a travel assist function has operated, in the display region; and displays a mark, which corresponds to a type of the travel assist function, in a vicinity of the image.

In a case in which at least one travel assist function among acceleration/deceleration or steering operates, the vehicle display control device of the first aspect displays predetermined information in a display region that is at a periphery of the driver's seat. Specifically, the processor displays an image, which expresses the reason why a travel assist function has operated, in the display region. Due thereto, the driver can understand the reason why the travel assist function has operated, merely by looking at the image displayed in the display region.

Further, the processor displays a mark, which corresponds to the type of the travel assist function, in a vicinity of the image. Due thereto, the driver can know the type of the travel assist function merely by glancing at the mark.

In a vehicle display control device of a second aspect, in the first aspect, the processor displays, as the mark, a figure that surrounds the image, and displays a mark of a shape that differs in accordance with the type of the travel assist function.

In the vehicle display control device of the second aspect, because the processor surrounds the image by a figure of a shape that differs in accordance with the type of the travel assist function, the vehicle occupant can know the type of the travel assist function merely by looking at the shape of the figure.

In a vehicle display control device of a third aspect, in the first aspect, the processor displays respectively different marks in a case in which acceleration of the vehicle is assisted, in a case in which deceleration is assisted, and in a case in which steering is assisted.

In the vehicle display control device of the third aspect, merely by looking at the mark, the vehicle occupant can know whether acceleration is being assisted, or deceleration is being assisted, or steering is being assisted.

In a vehicle display control device of a fourth aspect, in the first aspect, the processor displays respectively different marks in a manual driving mode in which a driver carries out all operations, and an automatic driving mode in which at least some operations are carried out automatically.

In the vehicle display control device of the fourth aspect, due to different marks being displayed in the manual driving mode and the automatic driving mode, the vehicle occupant can know in which driving mode the travel assist function is operating.

In a vehicle display control device of a fifth aspect, in the first aspect, the processor displays the mark at respectively different positions in a manual driving mode in which a driver carries out all operations, and an automatic driving mode in which at least some operations are carried out automatically.

In the vehicle display control device of the fifth aspect, merely by confirming the position of the mark, the vehicle occupant can know in which driving mode the travel assist function is operating.

In a vehicle display control device of a sixth aspect, in the first aspect, the processor displays respectively different images at least in a case in which an inter-vehicle distance to a preceding vehicle becomes a predetermined value or less, in a case in which, while traveling on a curve, a distance to a traffic signal that is lit to a color indicating stop becomes a predetermined value or less, and in a case in which a distance to a position of temporary stoppage becomes a predetermined value or less.

In the vehicle display control device of the sixth aspect, merely by glancing at the image, the vehicle occupant can know whether the reason why the travel assist function has operated is that there is a case in which the inter-vehicle distance to the preceding vehicle has become a predetermined value or less, or the vehicle is traveling on a curve, or there is a case in which the distance to a traffic signal that is lit to a color indicating stop has become a predetermined value or less, or the distance to a position of temporary stoppage has become a predetermined value or less.

A seventh aspect of the present disclosure is a vehicle display control method that, by a processor, displays predetermined information in a display region that is at a periphery of a driver's seat in a case in which at least one travel assist function among acceleration/deceleration or steering operates, the method comprising: displaying an image, which expresses a reason why a travel assist function has operated, in the display region; and displaying a mark, which corresponds to a type of the travel assist function, in a vicinity of the image.

A eighth aspect of the present disclosure is a non-transitory recording medium on which is recorded a program that is executable by a computer to perform processing for displaying predetermined information in a display region that is at a periphery of a driver's seat in a case in which at least one travel assist function among acceleration/deceleration or steering operates, and to perform processing of: displaying an image, which expresses a reason why a travel assist function has operated, in the display region; and displaying a mark, which corresponds to a type of the travel assist function, in a vicinity of the image.

As described above, in accordance with the vehicle display control device, vehicle display control method, and non-transitory recording medium on which a program is recorded that relate to the present disclosure, a vehicle occupant can intuitively understand the reason why a drive assist function has operated.

BRIEF DESCRIPTION OF THE DRAWINGS

Exemplary embodiments of the present disclosure will be described in detail based on the following figures, wherein.

DETAILED DESCRIPTION

A vehicle display control system 10 that is equipped with a vehicle display control device 28 relating to an embodiment is described with reference to the drawings. Note that arrow UP shown in FIG. 1 indicates the upper side in the vehicle vertical direction, and arrow RH indicates the right side in the vehicle transverse direction. The vertical direction and left-right direction in the following explanation mean the vertical of the vehicle vertical direction and the left and right of the vehicle transverse direction, respectively.

Figure 1:
FIG. 1 is a schematic drawing in which the front portion of a vehicle cabin interior of a vehicle, to which a vehicle display control device relating to an embodiment is applied, is viewed from a vehicle rear side.

As illustrated in FIG. 1, an instrument panel 14 is provided at the front portion of the interior of the vehicle cabin of a vehicle 12. The instrument panel 14 extends in the vehicle transverse direction, and a steering wheel 16 is provided at the vehicle right side of the instrument panel 14. Namely, in the present embodiment, as an example, the vehicle 12 is a right-hand-drive vehicle in which the steering wheel 16 is provided at the right side, and the driver's seat is set at the vehicle right side. Note that the present disclosure is not limited to this, and may be applied to a vehicle in which the driver's seat is set at the vehicle left side.

A windshield glass 18 is provided at the front end portion of the instrument panel 14. The windshield glass 18 extends in the vehicle vertical direction and the vehicle transverse direction, and divides the vehicle cabin interior and the vehicle cabin exterior.

A front pillar 20 at the vehicle right side is fixed to the vehicle right side end portion of the windshield glass 18. The front pillar 20 extends in the vehicle vertical direction, and the windshield glass 18 is fixed to the vehicle transverse direction inner side end portion of this front pillar 20. Further, the front end portion of a front side glass 22 is fixed to the vehicle transverse direction outer side end portion of the front pillar 20. Note that the vehicle left side end portion of the windshield glass 18 is fixed to an unillustrated front pillar at the vehicle left side.

Here, a first display portion 24 that has a display region V1 for images is provided at the instrument panel 14. The first display portion 24 is structured by a meter display that is provided at the vehicle front side of the driver's seat, at the vehicle right side of the instrument panel 14. The first display portion 24 is connected to various meters installed in the vehicle 12, and is provided at a position that is within the visual field of the driver in the state in which the driver's sightline is directed toward the vehicle front side.

A second display portion 25 that has a display region V2 for images is provided at the instrument panel 14. The second display portion 25 is structured by a center display that is disposed at the vehicle transverse direction central portion of the instrument panel 14.

A third display portion 26 that has a display region V3 for images is provided at the windshield glass 18. The third display portion 26 is set at the vehicle upper side of the first display portion 24, and is structured by a plane of projection that is projected by a head-up display device 46 (see FIG. 2) serving as a display device. Specifically, the head-up display device 46 that can project images is provided at the vehicle front side of the instrument panel 14, and images are projected from this head-up display device 46 onto the third display portion 26 of the windshield glass 18. Namely, the third display portion 26 is a portion of the windshield glass 18 that is used as the plane of projection of the head-up display device 46.

Here, the vehicle display control device 28 that structures the vehicle display control system 10 is provided at the vehicle 12. The vehicle display control device 28 of the present embodiment is, for example, an ECU (Electronic Control Unit) that carries out various types of control. The vehicle display control device 28 relating to the present embodiment is structured so as to, in a case in which at least one travel assist function among acceleration/deceleration or steering operates, display predetermined information on at least one display region among the display region V1, the display region V2 and the display region V3 that are at the periphery of the driver's seat.

(Hardware Structures of Vehicle Display Control Device 28)

Figure 2:
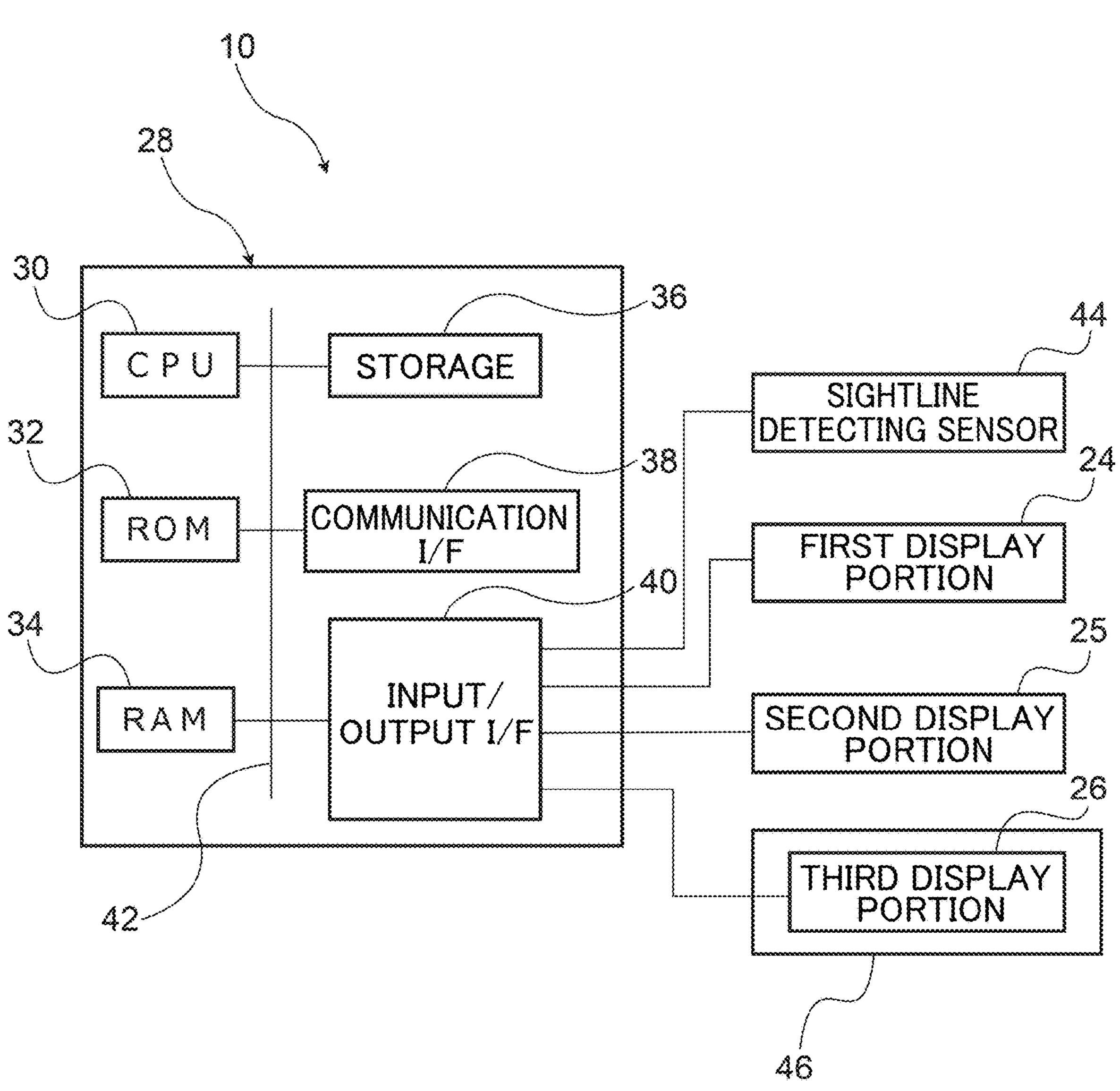
FIG. 2 is a block drawing illustrating hardware structures of the vehicle display control device relating to the embodiment.

As illustrated in FIG. 2, the vehicle display control device 28 is structured to include a CPU (Central Processing Unit: processor) 30, a ROM (Read Only Memory) 32, a RAM (Random Access Memory) 34, a storage 36, a communication interface (communication I/F) 38 and an input/output interface (input/output I/F) 40. These respective structures are connected so as to be able to communicate with one another via an internal bus 42.

The CPU 30 is a central computing processing unit, and executes various programs and controls respective sections. Namely, the CPU 30 reads-out programs from the ROM 32 or the storage 36, and executes programs by using the RAM 34 as a workspace. Further, in accordance with programs recorded in the ROM 32 or the storage 36, the CPU 30 carries out control of the above-described respective structures, and various types of computing processings.

The ROM 32 stores various programs and various data. The RAM 34 temporarily stores programs and data as a workspace. The storage 36 is structured by an HDD (Hard Disk Drive) or an SSD (Solid State Drive), and is a non-transitory recording medium that stores various programs, including the operating system, and various data. In the present embodiment, a display program, which is for carrying out display processing and the like, and the like are stored in the ROM 32 or the storage 36.

The communication interface 38 is an interface for the vehicle display control device 28 to communicate with servers and other devices. Standards such as, for example, CAN (Controller Area Network), Ethernet®, LTE (Long Term Evolution), FDDI (Fiber Distributed Data Interface), Wi-Fi® and the like are used thereat.

A sightline detecting sensor 44, the first display portion 24, the second display portion 25 and the head-up display device 46 are connected to the input/output interface 40. Further, images are projected onto the third display portion 26 by the head-up display device 46.

The sightline detecting sensor 44 is provided at the instrument panel 14 for example, and is disposed so as to be directed toward the face of the vehicle occupant seated in the driver's seat (the driver). By recognizing the eyes of the vehicle occupant, the sightline detecting sensor 44 detects the sightline of the vehicle occupant by using principles such as a corneal reflection method, a scleral reflection method, or the like.

(Functional Structures of Vehicle Display Control Device 28)

The vehicle display control device 28 realizes various functions by using the above-described hardware resources. The functional structures realized by the vehicle display control device 28 are described with reference to FIG. 3.

Figure 3:
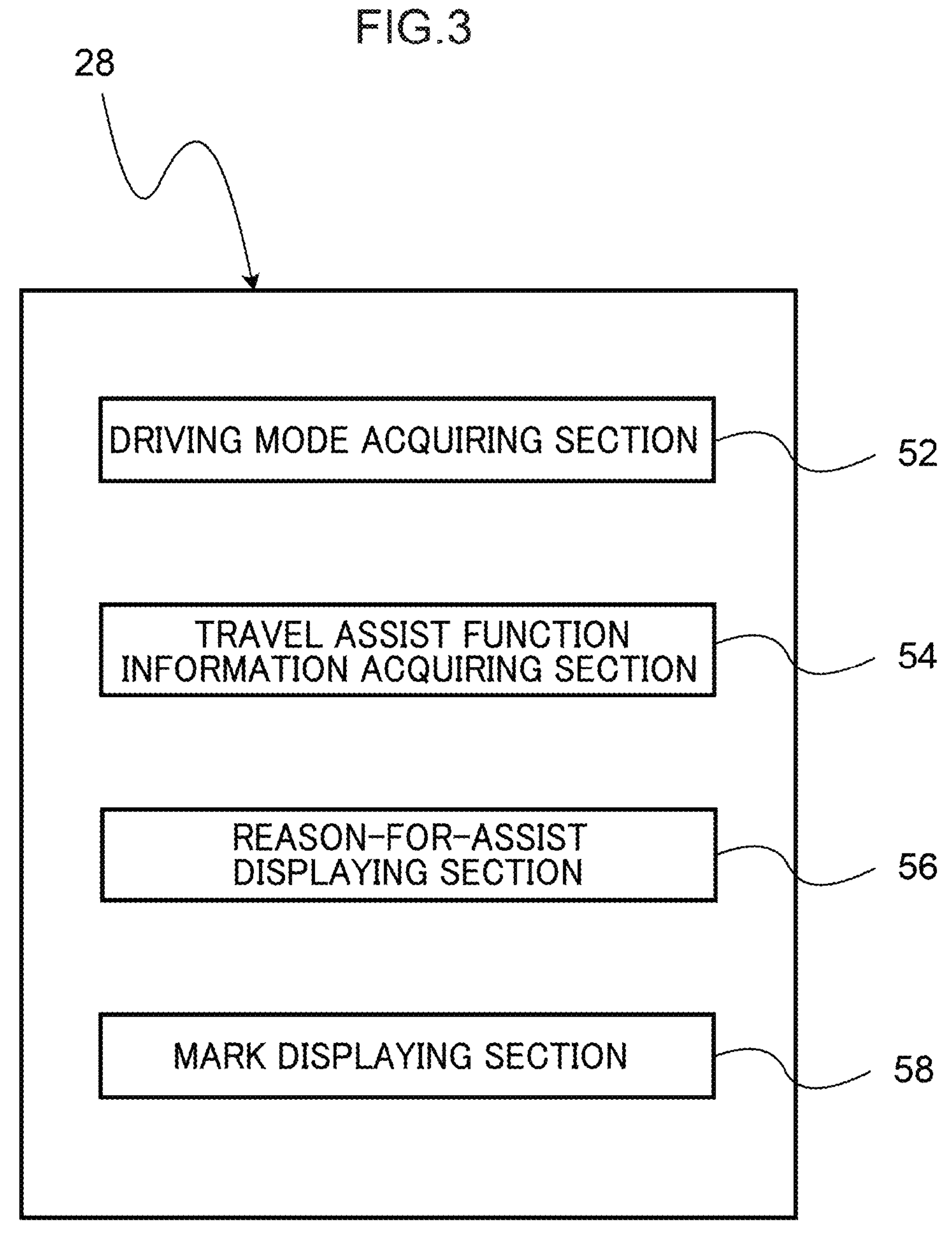
FIG. 3 is a block drawing illustrating functional structures of the vehicle display control device relating to the embodiment.

As illustrated in FIG. 3, the vehicle display control device 28 is structured to include, as the functional structures thereof, a driving mode acquiring section 52, a travel assist function information acquiring section 54, a reason-for-assist displaying section 56 and a mark displaying section 58. Note that these respective functional structures are realized by the CPU 30 reading-out and executing a program stored in the ROM 32 or the storage 36.

The driving mode acquiring section 52 acquires the driving mode of the vehicle 12. As an example, the vehicle 12 of the present embodiment has a manual driving mode in which the driver carries out all operations, and an automatic driving mode in which at least some of the operations are carried out automatically. Further, the automatic driving mode includes active cruise control that is a travel assist function that assists acceleration/deceleration or steering only in a state in which the vehicle occupant is grasping the steering wheel. Moreover, the automatic driving mode includes a hands-off driving mode in which travel assist functions operate even if the vehicle occupant's hands are off of the steering wheel, provided that the vehicle occupant is paying attention to the region ahead of the vehicle.

For example, in a hands-off state, travel assist functions may be carried out continuously in cases in which it is detected, on the basis of a signal from the sightline detecting sensor 44, that the direction of the sightline of the vehicle occupant is the vehicle forward direction.

The travel assist function information acquiring section 54 acquires information relating to the travel assist function that is operating. Specifically, the travel assist function information acquiring section 54 may acquire signals from actuators such as a steering actuator, an accelerator actuator, a brake actuator and the like that are not illustrated. The steering actuator carries out steering of the vehicle 12. The accelerator actuator carries out acceleration of the vehicle 12. The brake actuator carries out deceleration of the vehicle 12.

For example, in a case in which steering of the vehicle 12 is being carried out by the steering actuator, the travel assist function information acquiring section 54 acquires information relating to the travel assist functions, and thereby understands that the travel assist function that steers the vehicle 12 is operating.

Further, in a case in which acceleration of the vehicle 12 is being carried out by the accelerator actuator, the travel assist function information acquiring section 54 acquires information relating to the travel assist functions, and thereby understands that the travel assist function that causes the vehicle 12 to accelerate is operating. Moreover, in a case in which deceleration of the vehicle 12 is being carried out by the brake actuator, the travel assist function information acquiring section 54 acquires information relating to the travel assist functions, and thereby understands that the travel assist function that causes the vehicle 12 to decelerate is operating.

The reason-for-assist displaying section 56 displays, on a display region, an image expressing the reason why the travel assist function has operated. In the present embodiment, as an example, the reason-for-assist displaying section 56 is structured so as to display predetermined images in the display region V3.

Further, the reason-for-assist displaying section 56 of the present embodiment displays respectively different images in at least a case in which the inter-vehicle distance between the vehicle 12 and the preceding vehicle becomes a predetermined value or less, and a case in which, while the vehicle 12 is traveling on a curve, the distance to a traffic signal that is lit to a color indicating stop becomes a predetermined value or less, and a case in which the distance to a position of temporary stoppage becomes a predetermined value or less.

The mark displaying section 58 displays, in a vicinity of the image, a mark corresponding to the type of the travel assist function. As an example, the mark displaying section 58 of the present embodiment displays, as marks, figures that surround images, and displays marks of shapes that differ in accordance with the type of travel assist function.

Here, in the present embodiment, as an example, the mark displaying section 58 is structured so as to display marks at different positions in the manual driving mode in which the driver carries out all of the operations, and the automatic driving mode in which at least some operations are carried out manually. Further, the mark displaying section 58 is structured so as to display marks that differ in an active cruise control mode in which the vehicle occupant must grasp the steering wheel, and a hands-off mode in which the vehicle occupant does not have to grasp the steering wheel.

(Display Examples)

Figure 4:
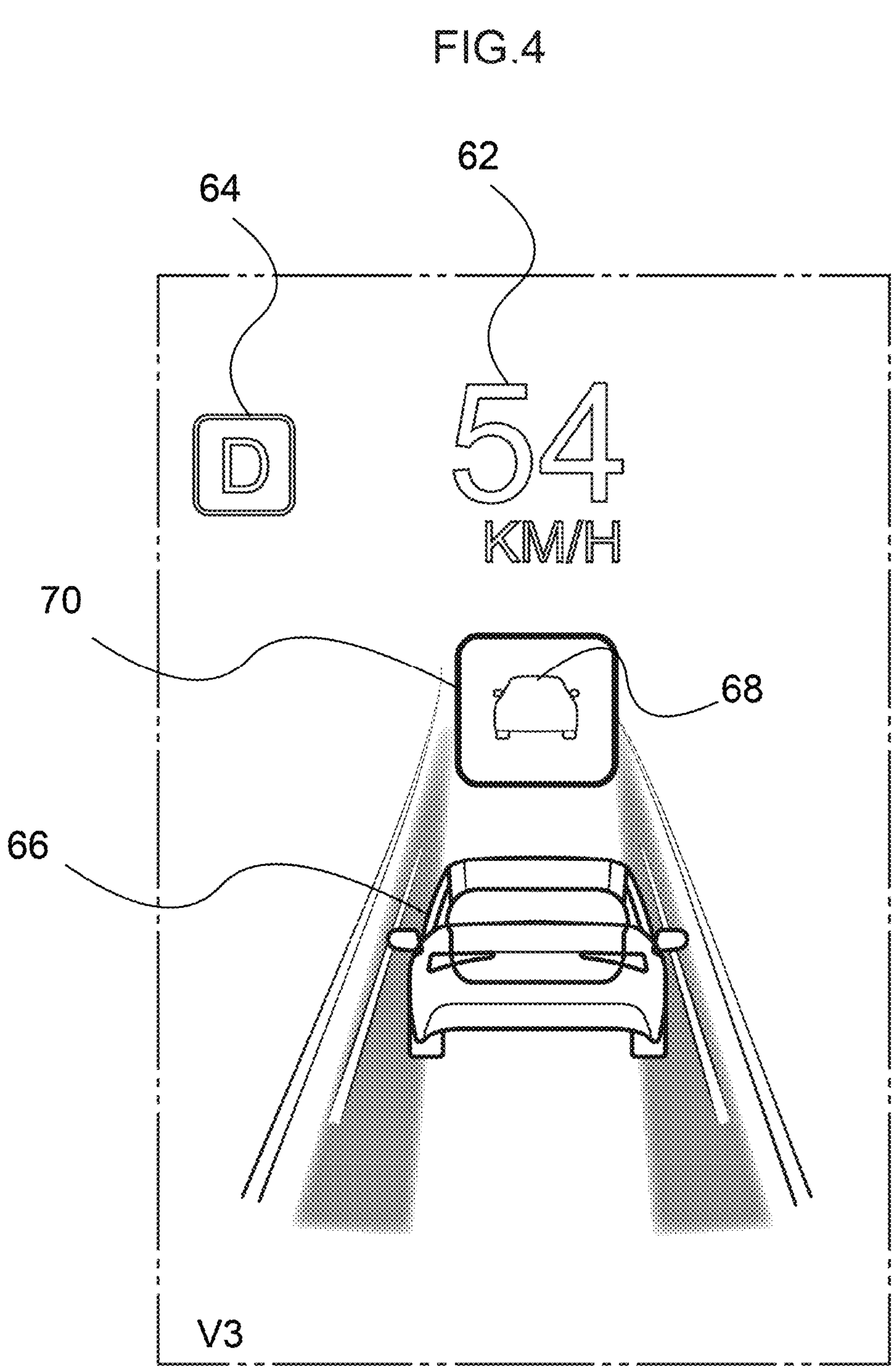
FIG. 4 is a drawing illustrating a display example of a display region in the embodiment, and illustrates a state in which a deceleration assist function is operating at the time of manual driving.

FIG. 4 is a drawing illustrating a display example of the display region V3 in the embodiment, and illustrates a state in which, at the time of manual driving, the assist function for deceleration is operating.

As illustrated in FIG. 4, a first image 62 that shows the current speed of the vehicle 12 is displayed at the upper portion of the display region V3. The speed of the vehicle 12 is calculated on the basis of a signal detected by an unillustrated vehicle speed sensor.

A second image 64 showing the current shift position of the vehicle 12 is displayed next to the first image 62 at the left side thereof. In FIG. 4, an image modeling "D" that indicates the shift position of drive is displayed as the second image 64.

A third image 66 that models the own vehicle is displayed at the lower portion of the display region V3. Further, an image that models the lane in which the vehicle 12 is traveling is displayed at the periphery of the third image 66, and is colored a predetermined color corresponding to the driving mode. For example, in the present embodiment, the road is displayed in grey along the lane.

A fourth image 68 expressing the reason why the travel assist function has operated is displayed between the first image 62 and the third image 66. Specifically, an image that models a preceding vehicle that is traveling in front of the vehicle 12 is displayed as the fourth image 68.

A mark 70 corresponding to the type of the travel assist function is displayed in a vicinity of the fourth image 68. A figure that surrounds the fourth image 68 is displayed as the mark 70 in the present embodiment, and the mark 70 is a substantially rectangular figure. Further, the mark 70 may be displayed in grey, in the same way as the road.

In the manual driving mode, due to the fourth image 68 being displayed in the display region V3 at substantially the same time as when the drive assist function that decelerates the vehicle 12 operates, the vehicle occupant can intuitively understand that deceleration has been carried out because the distance to the preceding vehicle has become a predetermined value or less.

Figure 5:
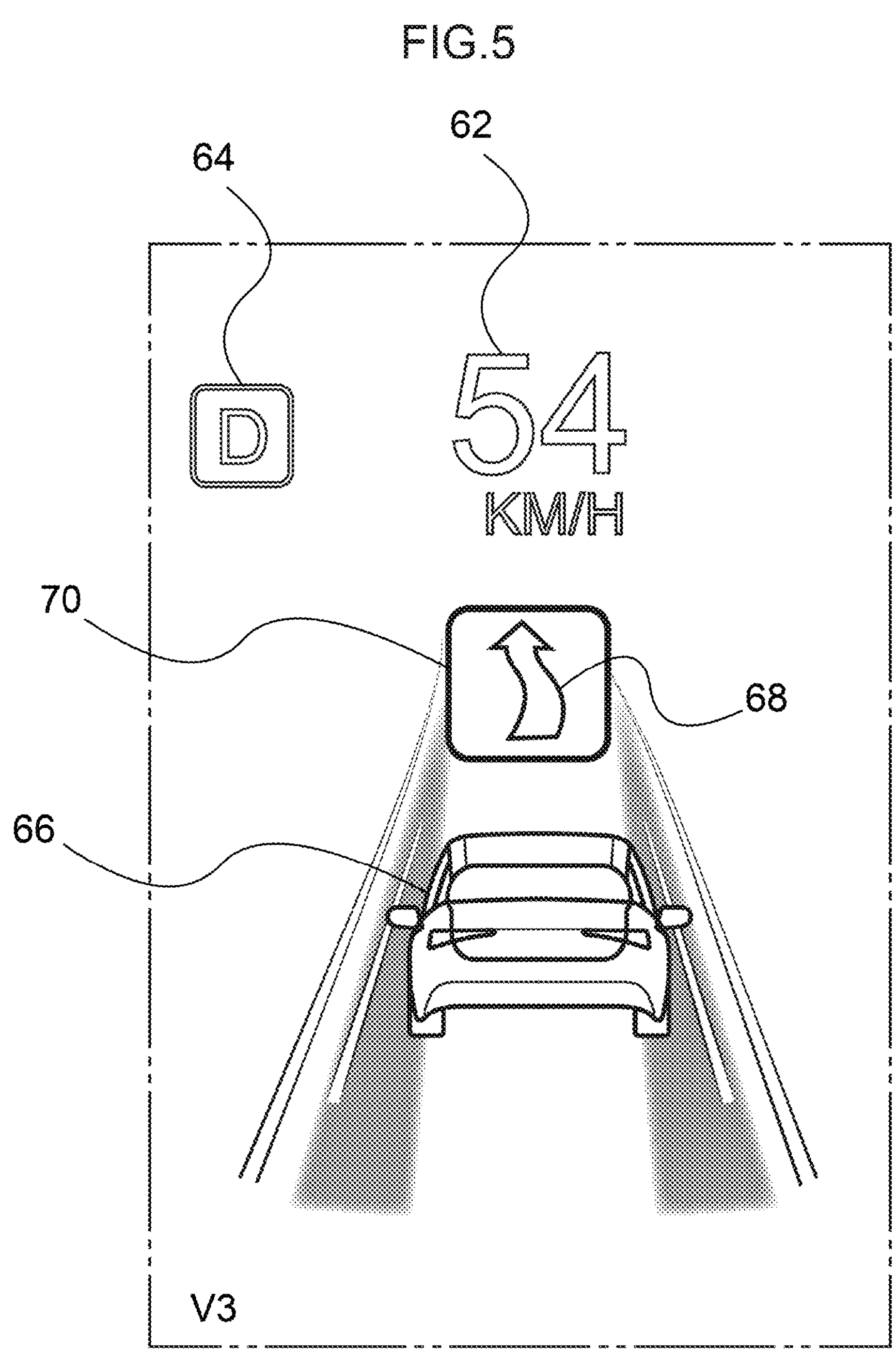
FIG. 5 is a drawing illustrating a display example of the display region in the embodiment, and illustrates a state in which the deceleration assist function is operating at the time of manual driving.

A state in which the assist function of deceleration is operating at the time of manual driving in the same way as in FIG. 4 is illustrated in FIG. 5.

As illustrated in FIG. 5, the first image 62 showing the current speed of the vehicle 12 is displayed at the upper portion of the display region V3. The second image 64 showing the current shift position of the vehicle 12 is displayed next to the first image 62 at the left side thereof.

The fourth image 68 expressing the reason why the travel assist function has operated is displayed beneath the first image 62. Specifically, an image that models an arrow indicating a curve is displayed as the fourth image 68. Further, the mark 70 that is substantially rectangular is displayed so as to surround the fourth image 68.

In the manual driving mode, due to the fourth image 68 being displayed in the display region V3 at substantially the same time as when the drive assist function that decelerates the vehicle 12 operates, the vehicle occupant can intuitively understand that deceleration has been carried out due to the vehicle 12 having entered into a curve at a relatively fast speed.

Figure 6:
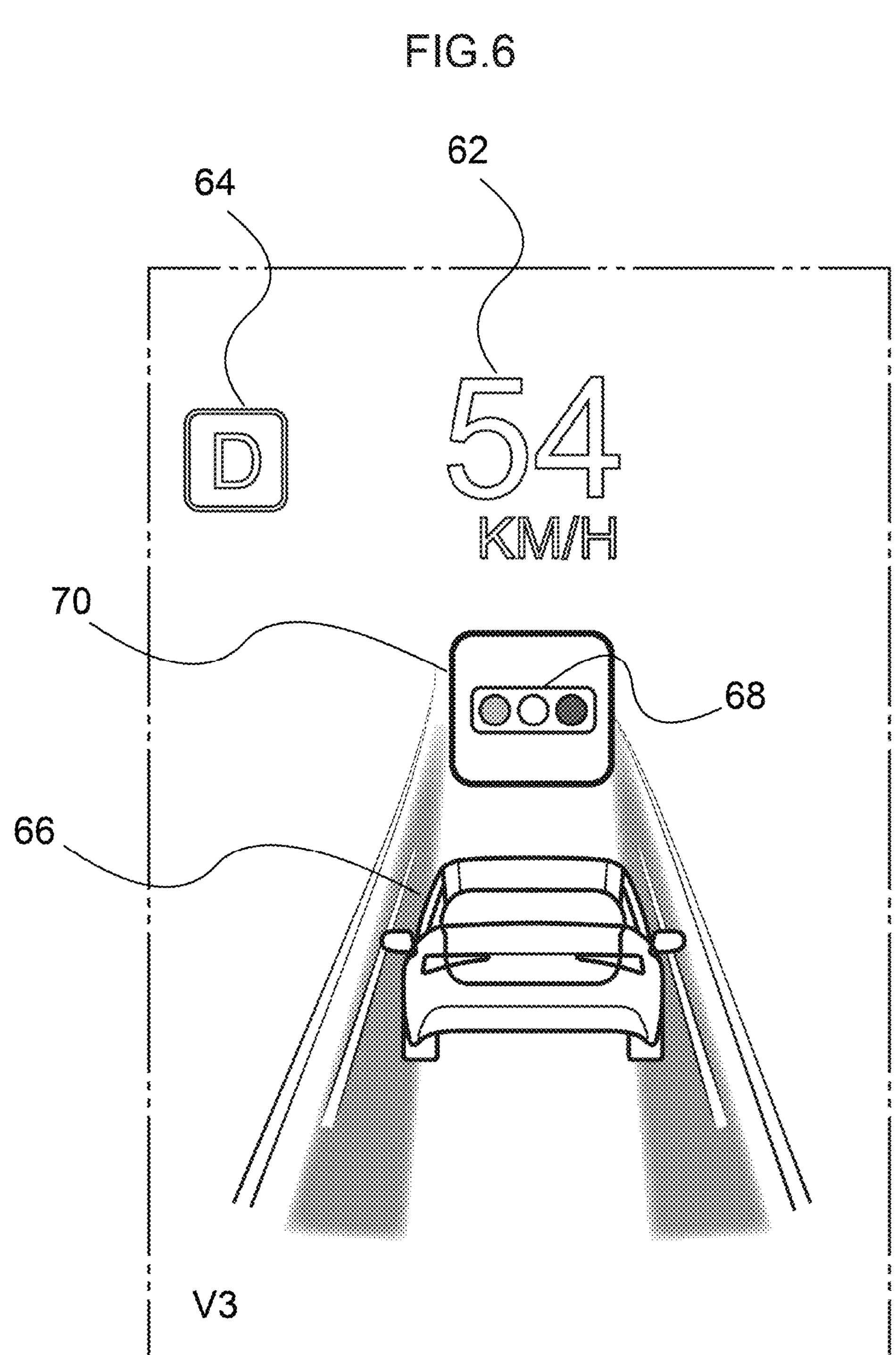
FIG. 6 is a drawing illustrating a display example of the display region in the embodiment, and illustrates a state in which the deceleration assist function is operating at the time of manual driving.

A state in which the assist function of deceleration is operating at the time of manual driving in the same way as in FIG. 4 is illustrated in FIG. 6. The first image 62, the second image 64 and the third image 66 are the same as in FIG. 4.

As illustrated in FIG. 6, the fourth image 68 expressing the reason why the travel assist function has operated is displayed beneath the first image 62. Specifically, an image that models a traffic signal that is lit to a color indicating stop is displayed as the fourth image 68. Further, the mark 70 that is substantially rectangular is displayed so as to surround the fourth image 68.

In the manual driving mode, due to the fourth image 68 being displayed in the display region V3 at substantially the same time as when the drive assist function that decelerates the vehicle 12 operates, the vehicle occupant can intuitively understand that deceleration has been carried out due to the distance to a traffic signal, which is lit to a color indicating stop, having become a predetermined value or less.

Figure 7:
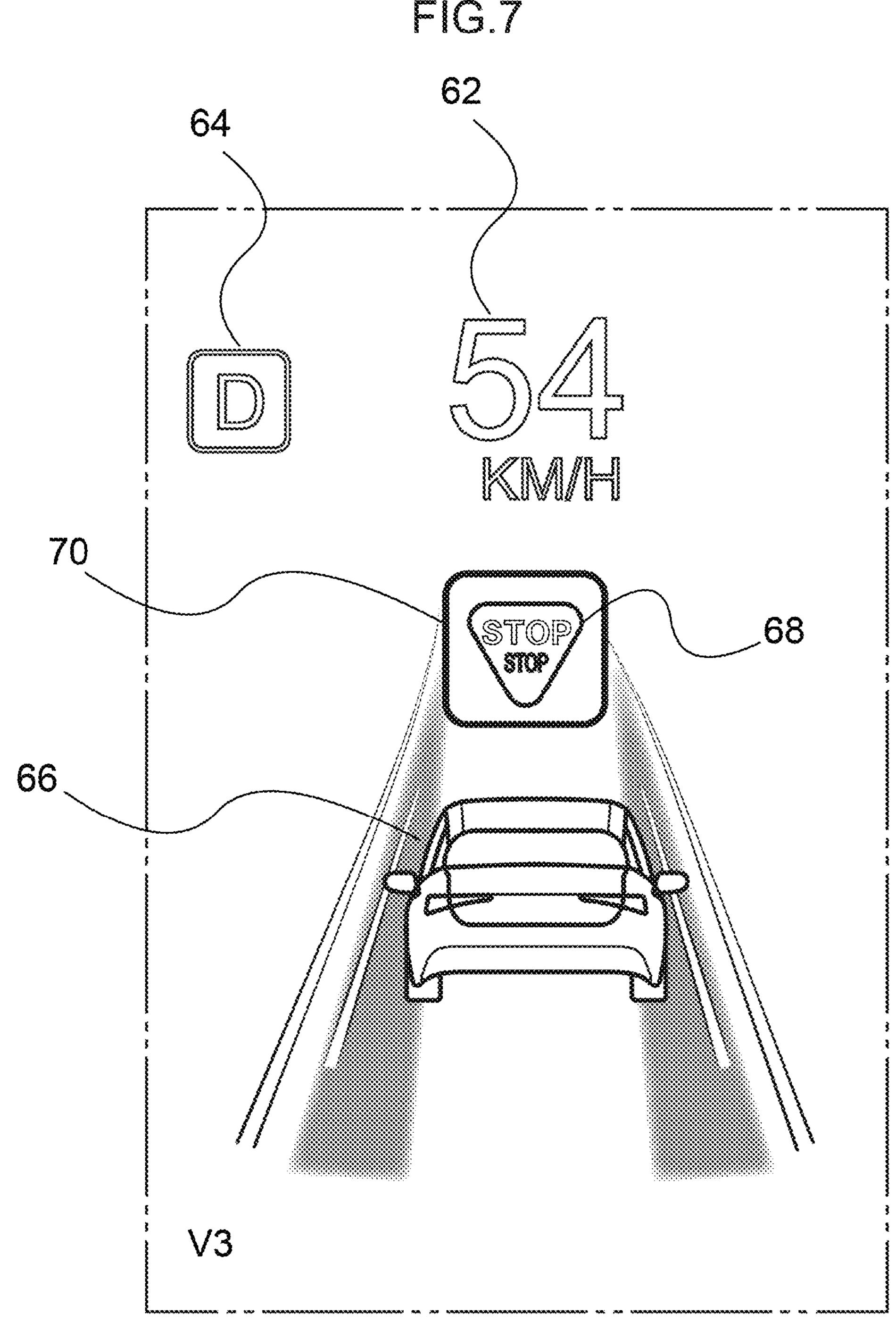
FIG. 7 is a drawing illustrating a display example of the display region in the embodiment, and illustrates a state in which the deceleration assist function is operating at the time of manual driving.

A state in which the assist function of deceleration is operating at the time of manual driving in the same way as in FIG. 4 is illustrated in FIG. 7. The first image 62, the second image 64 and the third image 66 are the same as in FIG. 4.

As illustrated in FIG. 7, the fourth image 68 expressing the reason why the travel assist function has operated is displayed beneath the first image 62. Specifically, an image that models a sign indicating a temporary stop is displayed as the fourth image 68. Further, the mark 70 that is substantially rectangular is displayed so as to surround the fourth image 68.

In the manual driving mode, due to the fourth image 68 being displayed in the display region V3 at substantially the same time as when the drive assist function that decelerates the vehicle 12 operates, the vehicle occupant can intuitively understand that deceleration has been carried out due to the distance to a point of temporary stoppage having become a predetermined value or less.

Figure 8:
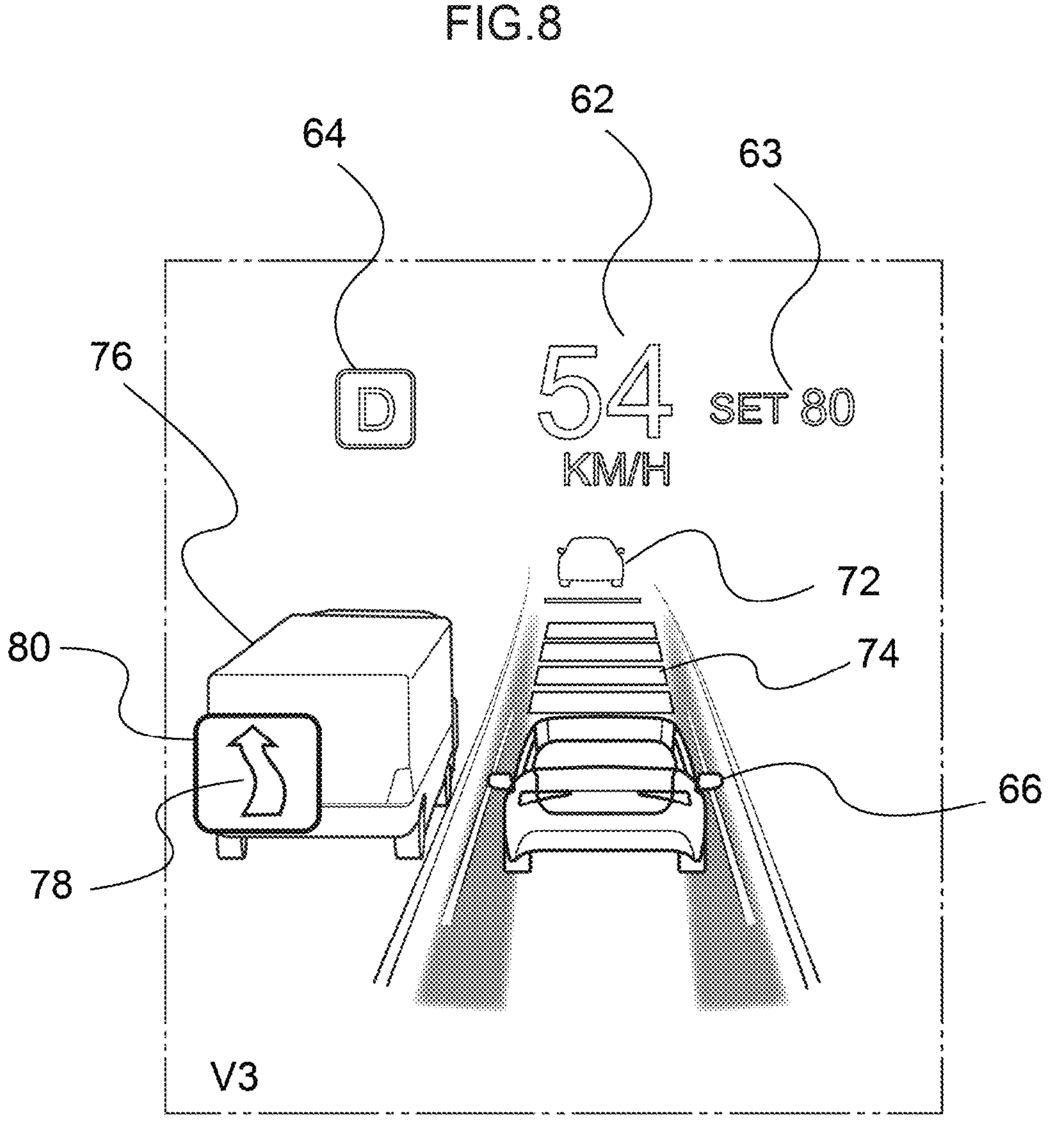
FIG. 8 is a drawing illustrating a display example of the display region in the embodiment, and illustrates a state in which the deceleration assist function is operating at the time of automatic driving.

FIG. 8 is a drawing illustrating a display example of the display region V3 in the embodiment, and illustrates a state in which, at the time of automatic driving, the assist function for deceleration is operating.

As illustrated in FIG. 8, the first image 62 that shows the current speed of the vehicle 12 is displayed at the upper portion of the display region V3. The second image 64 showing the current shift position of the vehicle 12 is displayed next to the first image 62 at the left side thereof.

A fifth image 63 that shows the set speed of the vehicle 12 is displayed next to the first image 62 at the right side thereof. In the present embodiment, an image showing that the vehicle speed has been set to 80 km/h is displayed as the fifth image 63. Therefore, in a case in which the interval between the vehicle 12 and the preceding vehicle is sufficiently long, the vehicle speed of 80 km/h is maintained without the vehicle occupant operating the accelerator pedal. Note that the set speed can be changed appropriately by operation by the vehicle occupant.

A sixth image 72 showing the preceding vehicle is displayed beneath the first image 62. Further, in the sixth image 72, a straight line is drawn beneath the figure that models the preceding vehicle, which indicates that the system of the vehicle 12 is recognizing the preceding vehicle.

A seventh image 74 that models plural lines is displayed between the sixth image 72 and the third image 66 that shows the own vehicle. The number of lines that are displayed as the seventh image 74 is increased/decreased in accordance with the inter-vehicle distance between the own vehicle and the preceding vehicle. For example, in a case in which the inter-vehicle distance between the own vehicle and the preceding vehicle becomes smaller, the number of lines displayed as the seventh image 74 decreases.

Note that, in the present embodiment, the road is displayed in green along the lane, but the present disclosure is not limited to this, and the road may be displayed in a color other than green. In some embodiments, the color of the road may be different in the manual driving mode and the automatic driving mode, but display in the same color may be carried out.

An eighth image 76 that models a vehicle that is traveling in an adjacent lane is displayed next to the third image 66 at the left side thereof. Plural sensors that can detect the situation at the periphery are provided at the vehicle 12, and vehicles at the periphery, which are detected by these sensors, are displayed in the display region V3.

Here, a ninth image 78 expressing the reason why the travel assist function has operated is displayed next to the third image 66 at the left side thereof. Specifically, an image that models an arrow indicating a curve is displayed as the ninth image 78. Further, a mark 80 that is substantially rectangular is displayed so as to surround the ninth image 78.

In the automatic driving mode, due to the ninth image 78 being displayed in the display region V3 at substantially the same time as when the drive assist function that decelerates the vehicle 12 operates, the vehicle occupant can intuitively understand that deceleration has been carried out due to the vehicle 12 having entered into a curve at a relatively fast speed. Note that, in FIG. 8, the eighth image 76 and the ninth image 78 overlap because another vehicle is traveling at the periphery of the vehicle 12. However, if there is a situation in which no other vehicle is traveling, only the ninth image 78 is displayed at that same position. In this way, in the present embodiment, an image expressing the reason why a travel assist function has operated is displayed at different positions in the manual driving mode and the automatic driving mode.

Figure 9:
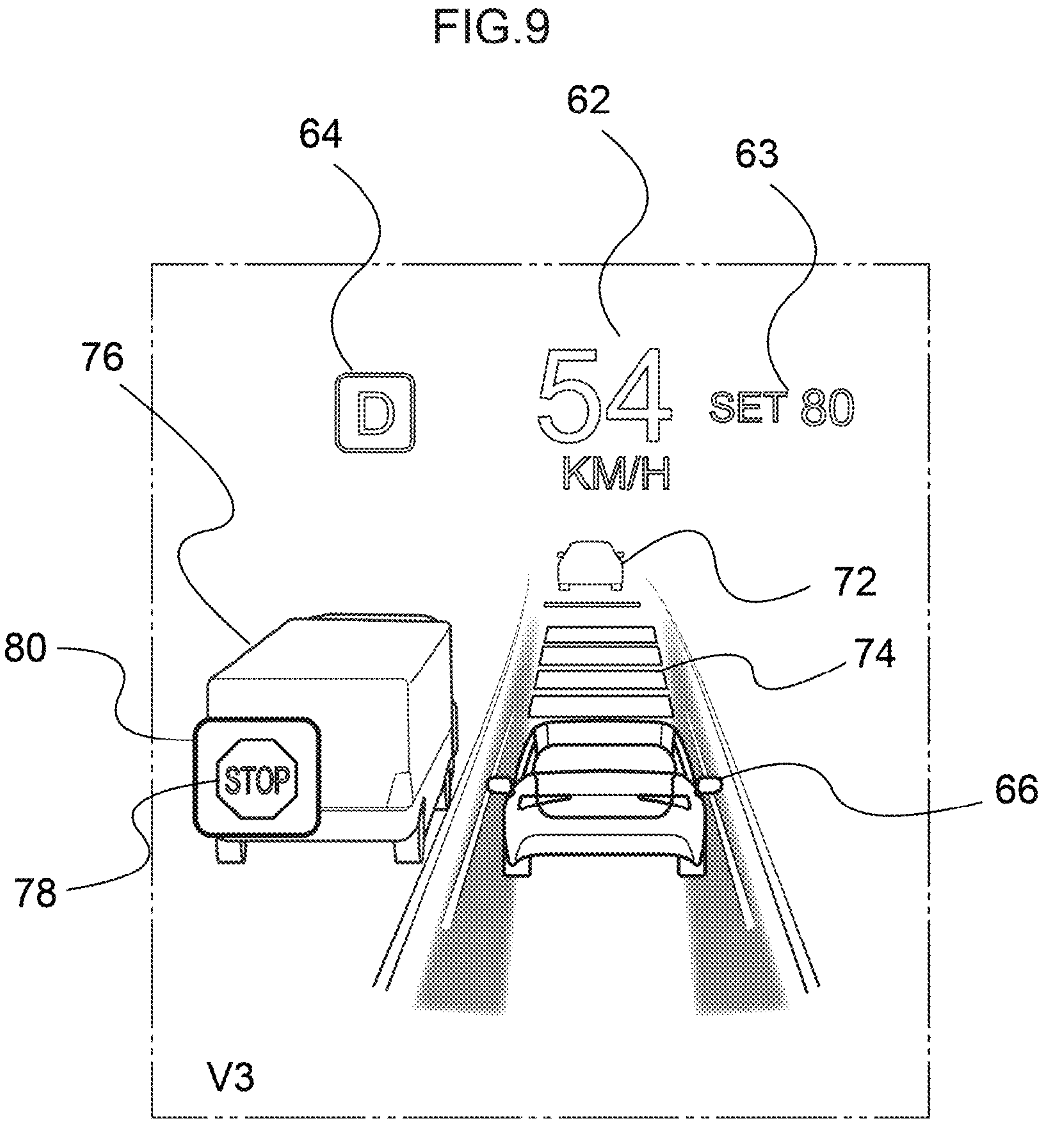
FIG. 9 is a drawing illustrating a display example of the display region in the embodiment, and illustrates a state in which the deceleration assist function is operating at the time of automatic driving.

FIG. 9 is a drawing illustrating a display example of the display region V3 in the embodiment, and illustrates a state in which the assist function of deceleration is operating in the automatic driving mode. Note that, in FIG. 9, the first image 62, the second image 64, the third image 66, the fifth image 63, the sixth image 72, the seventh image 74 and the eighth image 76 are the same as in FIG. 8.

As illustrated in FIG. 9, the ninth image 78 expressing the reason why the travel assist function has operated is displayed next to the third image 66 at the left side thereof. Specifically, an image that models a sign indicating a temporary stop is displayed as the ninth image 78. Further, the mark 80 that is substantially rectangular is displayed so as to surround the ninth image 78.

In the automatic driving mode, due to the ninth image 78 being displayed in the display region V3 at substantially the same time as when the drive assist function that decelerates the vehicle 12 operates, the vehicle occupant can intuitively understand that deceleration has been carried out due to the distance to a point of temporary stoppage having become a predetermined value or less.

Figure 10:
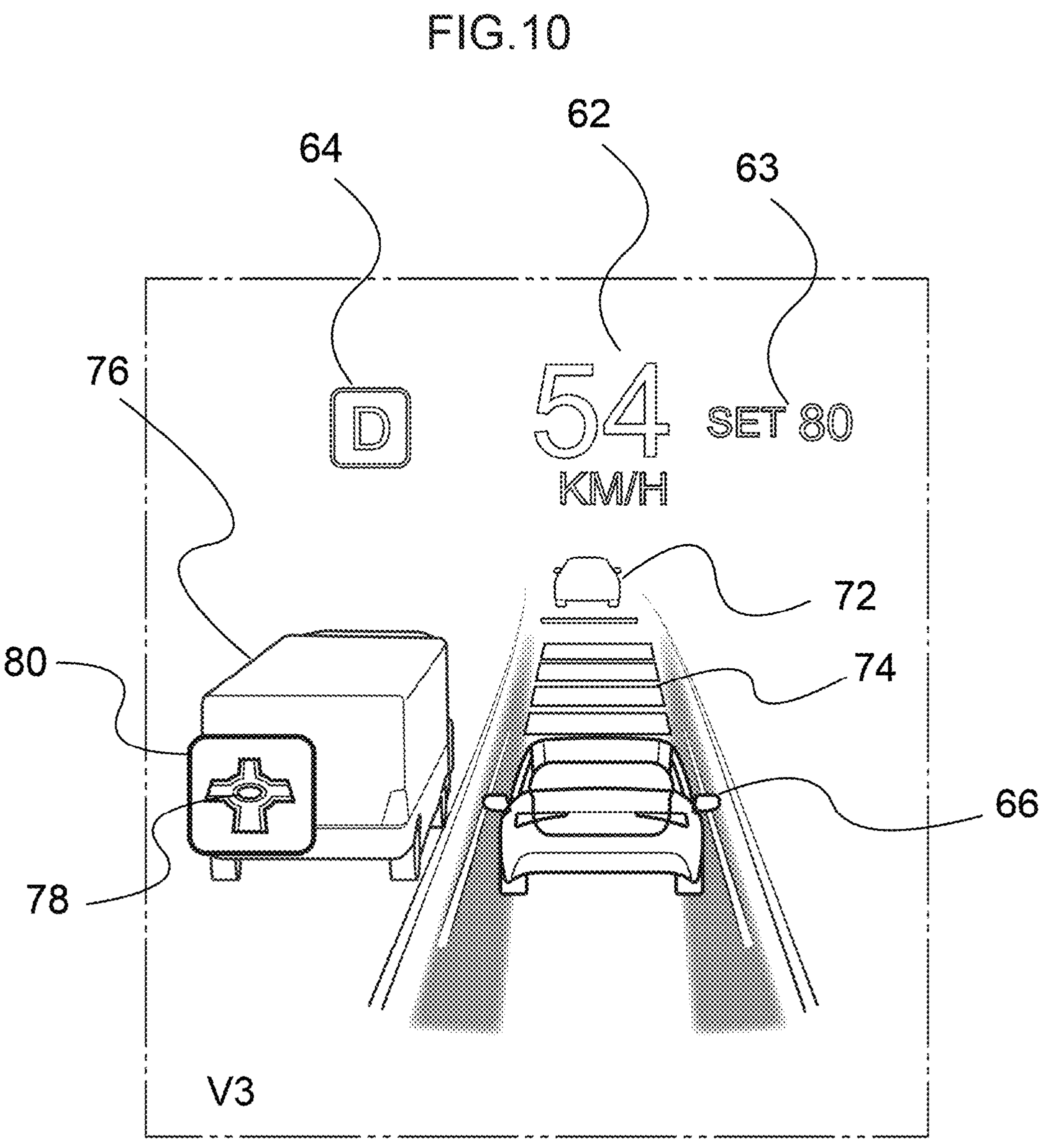
FIG. 10 is a drawing illustrating a display example of the display region in the embodiment, and illustrates a state in which the deceleration assist function is operating at the time of automatic driving.

FIG. 10 is a drawing illustrating a display example of the display region V3 in the embodiment, and illustrates a state in which, at the time of automatic driving, the assist function for deceleration is operating. Note that, in FIG. 10, the first image 62, the second image 64, the third image 66, the fifth image 63, the sixth image 72, the seventh image 74 and the eighth image 76 are the same as in FIG. 8.

As illustrated in FIG. 10, the ninth image 78 expressing the reason why the travel assist function has operated is displayed next to the third image 66 at the left side thereof. Specifically, an image that models a sign indicating a roundabout is displayed as the ninth image 78. Further, the mark 80 that is substantially rectangular is displayed so as to surround the ninth image 78.

In the automatic driving mode, due to the ninth image 78 being displayed in the display region V3 at substantially the same time as when the drive assist function that decelerates the vehicle 12 operates, the vehicle occupant can intuitively understand that deceleration has been carried out due to the vehicle speed when entering a roundabout being a predetermined value or greater.

Figure 11:
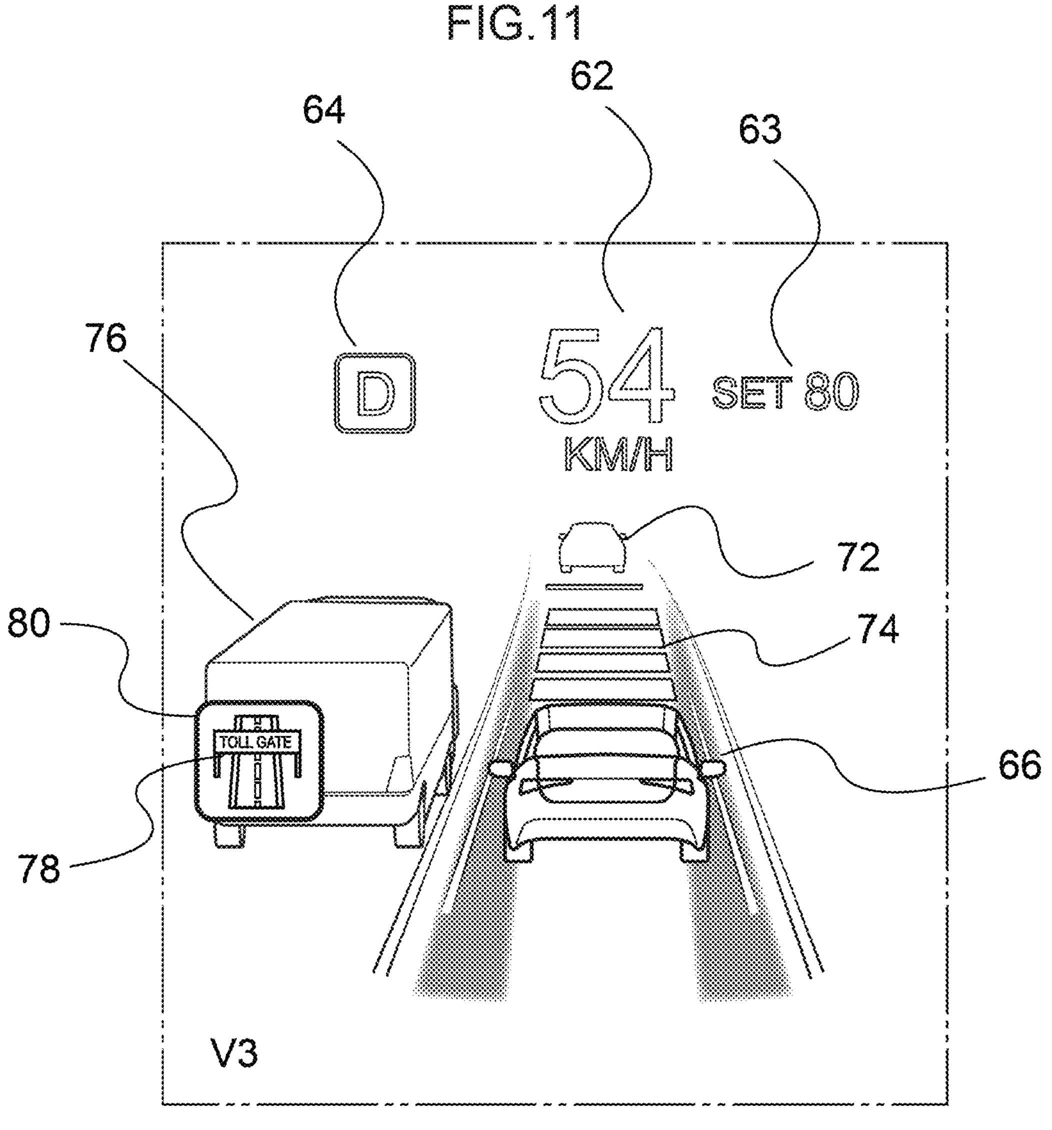
FIG. 11 is a drawing illustrating a display example of the display region in the embodiment, and illustrates a state in which the deceleration assist function is operating at the time of automatic driving.

FIG. 11 is a drawing illustrating a display example of the display region V3 in the embodiment, and illustrates a state in which, at the time of automatic driving, the assist function for deceleration is operating. Note that, in FIG. 11, the first image 62, the second image 64, the third image 66, the fifth image 63, the sixth image 72, the seventh image 74 and the eighth image 76 are the same as in FIG. 8.

As illustrated in FIG. 11, the ninth image 78 expressing the reason why the travel assist function has operated is displayed next to the third image 66 at the left side thereof. Specifically, an image that models a tollgate is displayed as the ninth image 78. Further, the mark 80 that is substantially rectangular is displayed so as to surround the ninth image 78.

In the automatic driving mode, due to the ninth image 78 being displayed in the display region V3 at substantially the same time as when the drive assist function that decelerates the vehicle 12 operates, the vehicle occupant can intuitively understand that deceleration has been carried out due to the distance to a tollgate having become a predetermined value or less.

Note that, in the hands-off driving mode, display that is similar to those of FIG. 8 and FIG. 11 is carried out. However, the color of the road and the color of the mark 80 may be displayed in different colors. For example, in a case of a general active cruise control mode, the color of the road and the color of the mark 80 may be displayed in green, whereas, in the hands-off driving mode, the color of the road and the color of the mark 80 may be displayed in blue.

(Operation)

Operation of the present embodiment is described next.

(Display Processing)

Figure 12:
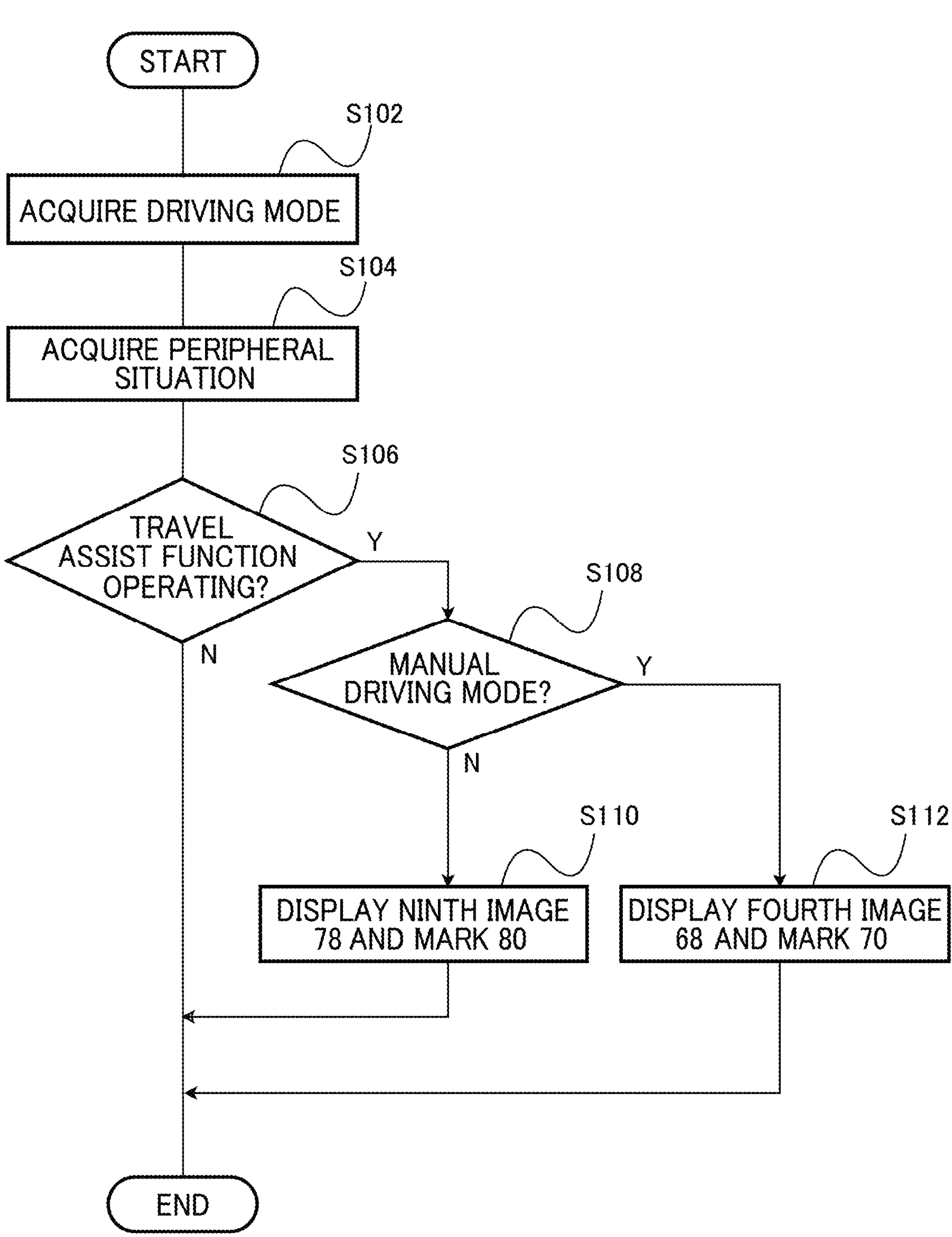
FIG. 12 is a flowchart illustrating an example of the flow of display processing in the embodiment.

An example of display processing that displays predetermined images in the third display portion 26, which is the plane of projection of the head-up display device 46, is described by using the flowchart shown in FIG. 12. This display processing is executed due to the CPU 30 reading-out the display program from the ROM 32 or the storage 36, and expanding and executing the display program in the RAM 34.

In step S102, the CPU 30 acquires the driving mode. Specifically, by the function of the driving mode acquiring section 52, the CPU 30 acquires information relating to the driving mode of the vehicle 12.

In step S104, the CPU 30 acquires the peripheral situation. Specifically, the CPU 30 acquires data relating to the peripheral situation of the vehicle 12, on the basis of signals from sensors installed in the vehicle 12.

In step S106, the CPU 30 judges whether or not a travel assist function is operating. For example, on the basis of information acquired from actuators such as the steering actuator, the accelerator actuator, the brake actuator and the like, the CPU 30 judges that a travel assist function is operating in a case in which any of the actuators is operating.

If it is judged in step S106 that a travel assist function is operating, the CPU 30 moves on to the processing of step S108. Further, if it is judged in step S106 that no travel assist function is operating, the CPU 30 ends the display processing.

In step S108, the CPU 30 judges whether or not the vehicle 12 is in the manual driving mode. Specifically, on the basis of the information acquired in step S102, if the driving mode of the vehicle 12 is the manual driving mode, the CPU 30 moves on to the processing of step S112. On the other hand, if the vehicle 12 is in the automatic driving mode, the CPU 30 judges that the vehicle 12 is not in the manual driving mode, and moves on to the processing of step S110.

In a case in which the driving mode of the vehicle 12 is the manual driving mode, in step S112, the CPU 30 displays the fourth image 68 and the mark 70 at a predetermined position. Specifically, by the function of the reason-for-assist displaying section 56, the CPU 30 displays the fourth image 68 that corresponds to the reason for the assistance in the display region V3. Further, by the function of the mark displaying section 58, the CPU 30 displays the mark 70 that corresponds to the type of the travel assist function. In this way, the fourth image 68 and the mark 70 that are illustrated in FIG. 4 through FIG. 7 are displayed. Then, the CPU 30 ends the display processing.

On the other hand, in a case in which the driving mode of the vehicle 12 is the automatic driving mode, in step S110, the CPU 30 displays the ninth image 78 and the mark 80 at a predetermined position. Specifically, by the function of the reason-for-assist displaying section 56, the CPU 30 displays the ninth image 78 that corresponds to the reason for the assistance in the display region V3. Further, by the function of the mark displaying section 58, the CPU 30 displays the mark 80 that corresponds to the type of the travel assist function. In this way, the ninth image 78 and the mark 80 that are illustrated in FIG. 8 through FIG. 11 are displayed. Then, the CPU 30 ends the display processing.

As described above, in the vehicle display control system 10 that is equipped with the vehicle display control device 28 relating to the present embodiment, in a case in which at least one travel assist function among acceleration/deceleration or steering operates, predetermined information is displayed in the display regions V1 through V3 or the like that are at the periphery of the driver's seat. Specifically, the reason-for-assist displaying section 56 displays the fourth image 68 or the ninth image, which expresses the reason why the travel assist function has operated, in the display region V3 or the like. Due thereto, due to the driver looking at the image that is displayed in the display region V3 or the like, the driver can know of the reason why the travel assist function has operated.

Further, in the present embodiment, the mark displaying section 58 displays, in a vicinity of the image, the mark 70 or the mark 80 that corresponds to the type of the travel assist function. Due thereto, the driver can know the type of the travel assist function, merely by glancing at the mark.

Moreover, in the present embodiment, the mark displaying section 58 surrounds the image by a figure of a shape that differs in accordance with the type of the travel assist function. Therefore, the vehicle occupant can know the type of the travel assist function merely by looking at the shape of the figure.

In particular, the mark displaying section 58 of the present embodiment displays different marks respectively in a case in which acceleration of the vehicle is being assisted, and in a case in which deceleration is being assisted, and in a case in which steering is being assisted. Due thereto, merely by looking at the mark, the vehicle occupant can know whether acceleration is being assisted, or deceleration is being assisted, or steering is being assisted.

Further, in the present embodiment, due to different marks being displayed in the manual driving mode and the automatic driving mode, the vehicle occupant can know in which driving mode the travel assist function is operating. In particular, in the present embodiment, even in the automatic driving mode, display is carried out in different colors in the active cruise control mode and the hands-off mode, and therefore, the vehicle occupant can easily understand in which driving mode the drive assist function is operating.

In the present embodiment, because the positions of the images and the marks are different in the manual driving mode and the automatic driving mode, merely by confirming the position of the mark, the vehicle occupant can understand in which driving mode the travel assist function is operating.

Although the vehicle display control system 10 relating to an embodiment has been described above, the technique of the present disclosure can, of course, be implemented in various forms within a scope that does not depart from the gist thereof. For example, although the above embodiment describes a structure in which predetermined images are displayed in the display region V3 of the third display portion 26, the present disclosure is not limited to this. For example, a structure in which predetermined images are displayed in the display region V1 of the first display portion 24 or in the display region V2 of the second display portion 25 may be employed.

Further, in the present embodiment, as illustrated in FIG. 8 through FIG. 11, a figure that is substantially rectangular and surrounds the ninth image 78 is displayed as the mark 80. However, the present disclosure is not limited to this. For example, the structures of the modified examples illustrated in FIG. 13 and FIG. 14 may be employed.

First Modified Example

Figure 13:
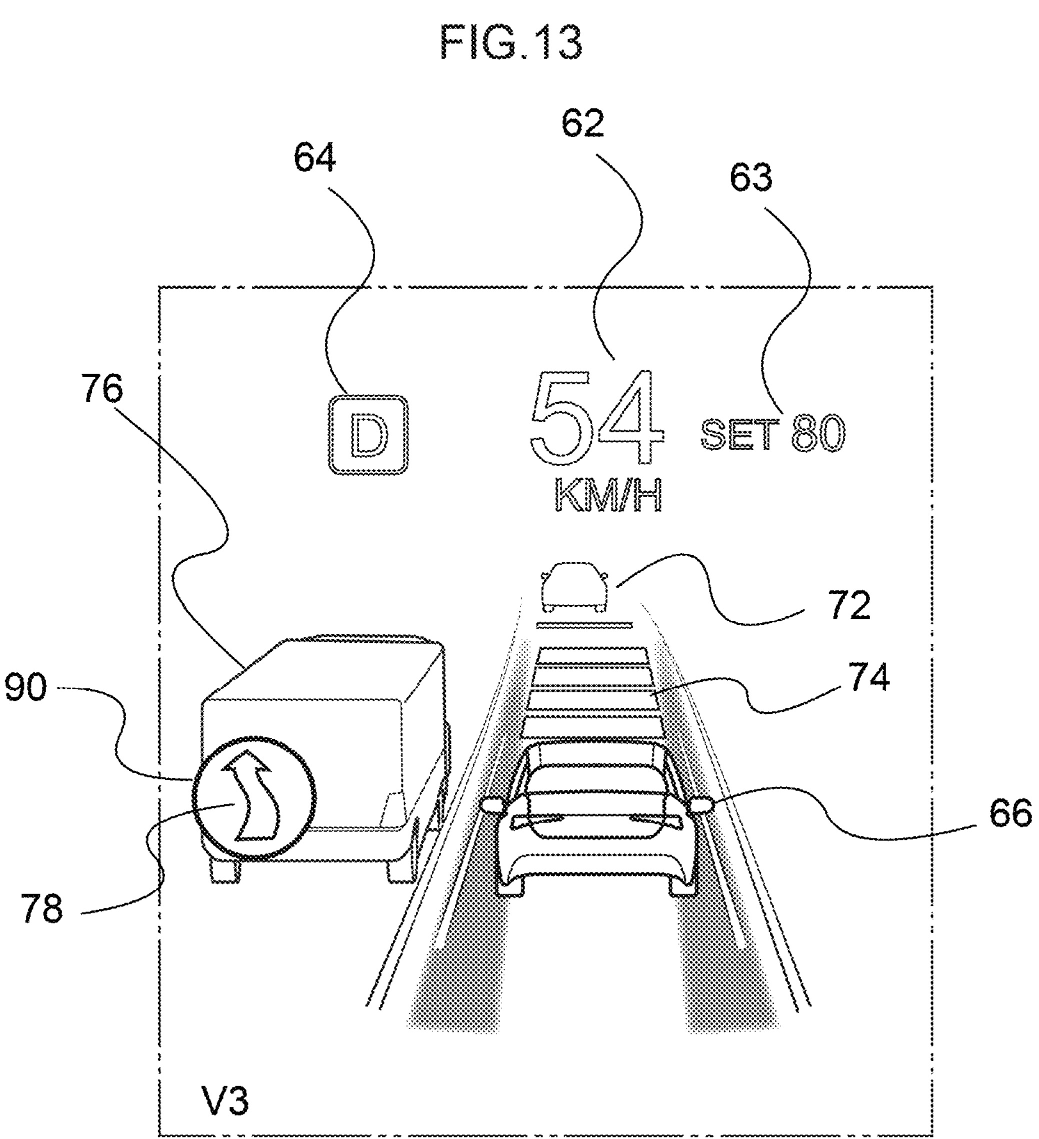
FIG. 13 is a drawing illustrating a display example of the display region in a first modified example, and illustrates a state in which the deceleration assist function is operating at the time of automatic driving.

FIG. 13 is a drawing illustrating a display example of a display region in a first modified example, and illustrates a state in which the assist function for deceleration is operating at the time of automatic driving. As illustrated in FIG. 13, an image that models an arrow indicating a curve is displayed as the ninth image 78 that expresses the reason why the travel assist function has operated. Further, a mark 90 that is circular is displayed so as to surround the ninth image 78.

Second Modified Example

Figure 14:
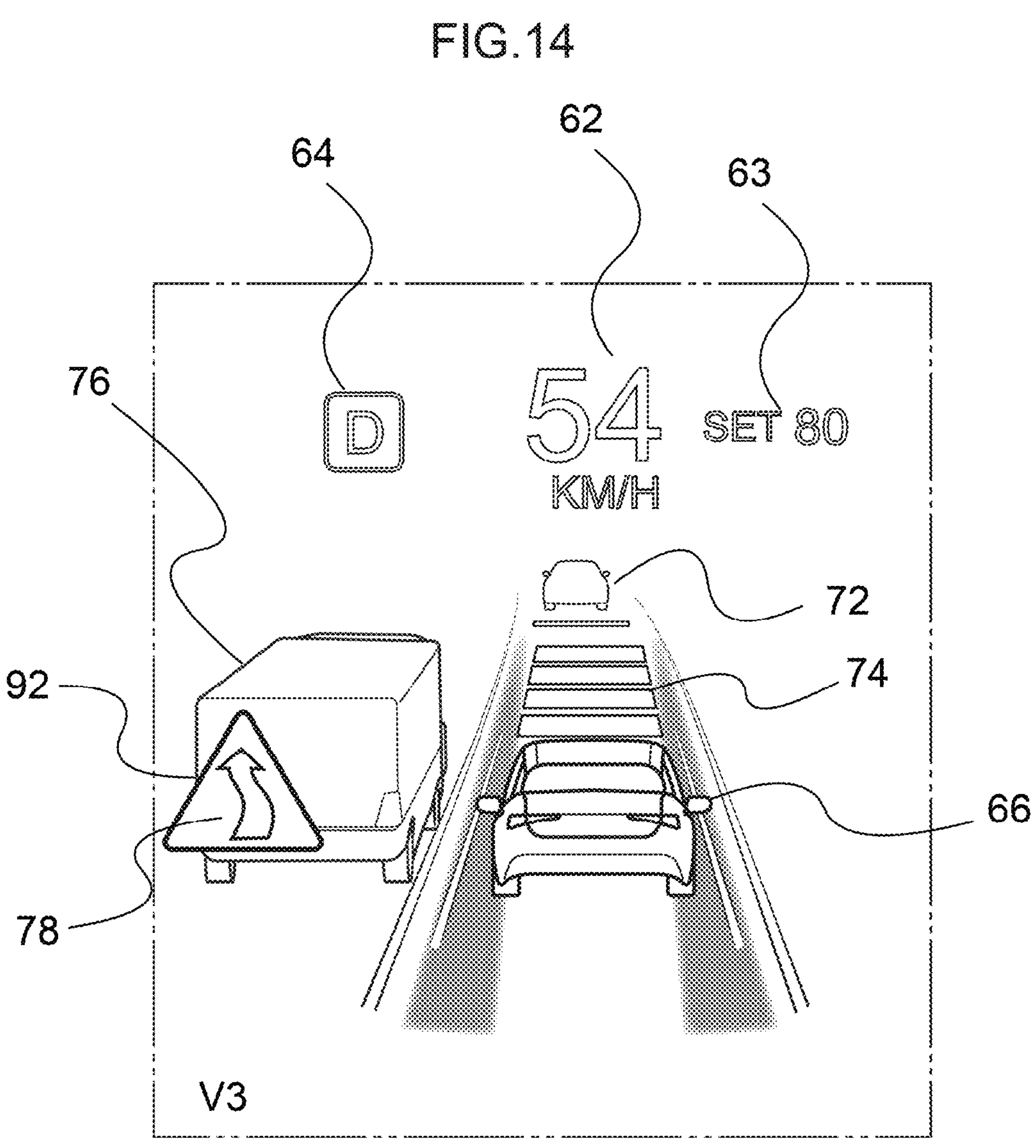
FIG. 14 is a drawing illustrating a display example of the display region in a second modified example, and illustrates a state in which the deceleration assist function is operating at the time of automatic driving.

FIG. 14 is a drawing illustrating a display example of a display region in a second modified example, and illustrates a state in which the assist function for deceleration is operating at the time of automatic driving. As illustrated in FIG. 14, an image that models an arrow indicating a curve is displayed as the ninth image 78 that expresses the reason why the travel assist function has operated. Further, a mark 92 that is triangular is displayed so as to surround the ninth image 78.

Further, the above embodiment describes the travel assist function for decelerating the vehicle 12, but similar display may be carried out also with respect to travel assist functions for acceleration and steering and the like of the vehicle 12. For example, a rectangular mark may be displayed in a case in which the type of the travel assist function is deceleration, a circular mark may be displayed in a case in which the type of the travel assist function is acceleration, and a triangular mark may be displayed in a case in which the type of the travel assist function is steering.

Moreover, the color of the mark may be varied at the times of carrying out travel assistance of deceleration, steering and acceleration, respectively. For example, a circular mark may be displayed in red at the time of deceleration travel assistance, a circular mark may be displayed in a color other than red, such as green or the like, at the time of steering travel assistance, and a circular mark may be displayed in a color other than red or green, such as yellow or the like, at the time of acceleration travel assistance. Here, the present disclosure is not limited to a form of varying the color of the edge of the mark, and the color within the frame of the mark may be varied.

Further, even if marks that are the same in that they are circular are used, the marks may be displayed by being varied in accordance with the type of the travel assist function so as to be a double circle, a bold-line circle, a wavy-line circle, or the like.

Moreover, the present disclosure is not limited to a structure in which a figure that surrounds an image is displayed as a mark. For example, a mark that correspond to the type of the travel assist function may be displayed so as to be adjacent to an image. Specifically, in the case of deceleration, as the mark, an arrow that is directed downward may be displayed as an animation adjacent to the image.

Further, the processing, which is executed by the CPU 30 reading-in a program in the above-described embodiment, may be executed by any of various types of processors other than the CPU 30. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the above-described processing may be executed by one of these various types of processors, or may be executed by a combination of two or more of the same type or different types of processors, e.g., plural FPGAs, or a combination of a CPU and an FPGA, or the like. Further, the hardware structures of these various types of processors are, more specifically, electrical circuits that combine circuit elements such as semiconductor elements and the like.

Further, the above-described embodiment is structured such that various data are stored in the storage 36, but the present disclosure is not limited to this. For example, a non-transitory recording medium such as a CD (Compact Disk), a DVD (Digital Versatile Disk), a USB (Universal Serial Bus) memory or the like may be used as the storage. In this case, various programs and data and the like are stored on the recording medium.

The flow of the processings described in the above embodiment is an example, and unnecessary steps may be deleted therefrom, new steps may be added thereto, or the order of processings may be rearranged, within a scope that does not depart from the gist of the present disclosure.

What is claimed is:

1. A vehicle display control device for a vehicle that displays predetermined information in a display region that is at a periphery of a driver's seat in a case in which at least one travel assist function among acceleration/deceleration or steering operates, the device comprising a processor, wherein the processor is configured to:

in a case in which a driving mode of the vehicle is a manual driving mode, display a first image, which expresses a reason why a travel assist function has operated, at a first predetermined position in the display region, and display a first mark, which corresponds to a type of the travel assist function, in a vicinity of the first image; and in a case in which the driving mode of the vehicle is an automatic driving mode, display a second image, which expresses a reason that the travel assist function has operated, at a second predetermined position in the display region, different from the first predetermined position, and display a second mark, which corresponds to a type of the travel assist function, in a vicinity of the second image.

2. The vehicle display control device of claim 1, wherein the processor displays, as the first mark, a figure that surrounds the first image, displays as the second mark, a figure that surrounds the second image, and displays the first mark and the second mark of a shape that differs in accordance with the type of the travel assist function.

3. The vehicle display control device of claim 1, wherein the processor displays respectively different marks in a case in which acceleration of the vehicle is assisted, in a case in which deceleration is assisted, and in a case in which steering is assisted.

4. The vehicle display control device of claim 1, wherein the processor displays respectively different images at least in a case in which an inter-vehicle distance to a preceding vehicle becomes a predetermined value or less, in a case in which, while traveling on a curve, a distance to a traffic signal that is lit to a color indicating stop becomes a predetermined value or less, and in a case in which a distance to a position of temporary stoppage becomes a predetermined value or less.

5. A vehicle display control method for a vehicle that, by a processor, displays predetermined information in a display region that is at a periphery of a driver's seat in a case in which at least one travel assist function among acceleration/deceleration or steering operates, the method comprising:

in a case in which a driving mode of the vehicle is a manual driving mode, displaying a first image, which expresses a reason why a travel assist function has operated, at a first predetermined position in the display region, and displaying a first mark, which corresponds to a type of the travel assist function, in a vicinity of the first image; and in a case in which the driving mode of the vehicle is an automatic driving mode, displaying a second image, which expresses a reason that the travel assist function has operated, at a second predetermined position in the display region, different from the first predetermined position, and displaying a second mark, which corresponds to a type of the travel assist function, in a vicinity of the second image.

6. A non-transitory recording medium on which is recorded a program that is executable by a computer of a vehicle to perform processing for displaying predetermined information in a display region that is at a periphery of a driver's seat in a case in which at least one travel assist function among acceleration/deceleration or steering operates, and to perform processing of:

in a case in which a driving mode of the vehicle is a manual driving mode, displaying a first image, which expresses a reason why a travel assist function has operated, at a first predetermined position in the display region, and displaying a first mark, which corresponds to a type of the travel assist function, in a vicinity of the first image; and in a case in which the driving mode of the vehicle is an automatic driving mode, displaying a second image, which expresses a reason that the travel assist function has operated, at a second predetermined position in the display region, different from the first predetermined position, and displaying a second mark, which corresponds to a type of the travel assist function, in a vicinity of the second image.

* * * * *